Patented Oct. 10, 1922.

1,431,394

UNITED STATES PATENT OFFICE.

DAVID F. GOULD, OF CORNWELLS, PENNSYLVANIA, ASSIGNOR TO THE BARRETT COMPANY, A CORPORATION OF NEW JERSEY.

PROCESS OF PURIFYING NAPHTHALENE.

No Drawing. Application filed December 15, 1920. Serial No. 430,988.

*To all whom it may concern:*

Be it known that I, DAVID F. GOULD, a citizen of the United States, residing at Cornwells, in the county of Bucks and State of Pennsylvania, have invented certain new and useful Improvements in Processes of Purifying Naphthalene, of which the following is a specification.

My invention relates to improvements in the process of purifying naphthalene. In the purification of naphthalene as generally practiced, the crude material containing a considerable percentage of oily impurities is brought to a molten condition and run into shallow pans where it is allowed to slowly crystallize. This step in the process is for the purpose of purifying the compound by fractional crystallization; i. e., it performs the function of allowing the compound to form well defined crystals which are more readily separated from the oily impurities in the subsequent steps of the process, which generally consists of crushing the cold crystallized material and removing the oily impurities by centrifuging, hydraulic pressing or other means.

I have found that the fractional crystallization above referred to may be readily effected by more economical means than by cooling in shallow pans. I have found that when the molten crude material, at a temperature slightly above its melting point, is agitated in a tank or other suitable container with water or aqueous salt solution in which it is substantially insoluble, and the whole mass slowly agitated, the solid naphthalene separates in a definite crystalline form which adapts itself readily to subsequent treatment. The water can be drained from the crystals. The impurities can at a later time be removed by centrifuging or hydraulic pressure, or the slurry of crystals and water or other immiscible fluid can be separated simultaneously.

In practicing this invention, while I do not wish to limit myself to the exact procedure described below, the following may serve as an example to illustrate the invention and make it clearly understood:

Molten crude naphthalene may be introduced into an agitating tank at a temperature of about 85° C. with an equal volume of water at approximately the same temperature. The mixture is vigorously agitated until an intimate mixture is obtained; cold water is run in, with slow agitation of the mass, at such a rate that the temperature of the mass slowly drops to about 65° C. during a period of about eight hours. The slurry resulting is pumped to centrifugals where the water and oily impurities which have separted from the naphthalene are removed as completely as possible, or the water may be drained off first and the impurities then removed independently. This procedure has been found to produce crystalline scales of naphthalene, of uniform size of the same shape and structure consisting of several individual thin crystals of naphthalene laminated one upon the other.

It is to be understood that the water may be added before the naphthalene is melted and the mixture of crude naphthalene and water then heated to melt the naphthalene, after which the mixture may be vigorously agitated and then cooled. Instead of adding cold water for cooling purposes the cooling may be permitted to take place by radiation, or cooling coils or other convenient cooling means may be used.

Some of the advantages with my process are as follows:

It effects a decided economy of operation over the old method of cooling in pans, digging out, crushing and conveying to centrifugals, in that all of the materials may be handled through pumps with no manual labor.

The process effects further economy in the original investment in that a complete series of shallow pans with buildings for housing them can be replaced by one or two agitating tanks which need not even be protected from the weather.

The process eliminates fire risk necessarily accompanying the use of open pans containing inflammable material.

I claim:

1. In the process of purifying naphthalene, the steps which comprise agitating a molten mass of the same with an immiscible liquid, and gradually cooling the mass while agitating the same to effect relatively slow crystallization of the naphthalene.

2. In the process of purifying naphthalene, the steps which comprise agitating a molten mass of the same with an immiscible liquid in which the naphthalene and its impurities are substantially insoluble, and gradually cooling the mass while agitating the same to effect relatively slow crystallization of the naphthalene.

3. In the process of purifying naphthalene, the steps which comprise agitating a molten mass of the same with an immiscible liquid in which the naphthalene and its impurities are substantially insoluble, and gradually cooling the mass while agitating the same to effect a regulated rate of crystallization of the naphthalene.

4. In the process of purifying naphthalene, the steps which comprise agitating a molten mass of the same with water in which the naphthalene and its impurities are substantially insoluble, and gradually cooling the mass while agitating the same to effect relatively slow crystallization of the naphthalene.

5. In the process of purifying naphthalene, the steps which comprise agitating a molten mass of the same with water, at a temperature above the melting point of naphthalene, in which the naphthalene and its impurities are substantially insoluble, and gradually cooling the mass while agitating the same to effect relatively slow crystallization of the naphthalene.

6. That step in the purification of naphthalene, which consists in the production of crystalline scales of naphthalene of regular size by agitating molten naphthalene and water, and slowly cooling the mixture below the melting point of the naphthalene.

7. The process of purifying naphthalene, which comprises melting said naphthalene, mixing therewith water, and then gradually cooling the mixture by the addition of cold water while agitating.

8. The process of purifying naphthalene, which comprises intimately mixing naphthalene and water at about 85° C. gradually reducing the temperature to about 65° C. while agitating and separating the liquid from solid material.

In testimony whereof I affix my signature.

DAVID F. GOULD.